(12) United States Patent
Dai et al.

(10) Patent No.: US 12,348,986 B2
(45) Date of Patent: Jul. 1, 2025

(54) METHOD AND APPARATUS FOR MULTICAST AND BROADCAST SERVICES

(71) Applicant: LENOVO (BEIJING) LIMITED, Beijing (CN)

(72) Inventors: Mingzeng Dai, Shanghai (CN); Lianhai Wu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 393 days.

(21) Appl. No.: 18/006,673

(22) PCT Filed: Jul. 24, 2020

(86) PCT No.: PCT/CN2020/104478
§ 371 (c)(1),
(2) Date: Jan. 24, 2023

(87) PCT Pub. No.: WO2022/016518
PCT Pub. Date: Jan. 27, 2022

(65) Prior Publication Data
US 2023/0328543 A1   Oct. 12, 2023

(51) Int. Cl.
*H04W 24/00* (2009.01)
*H04W 24/02* (2009.01)
*H04W 76/20* (2018.01)

(52) U.S. Cl.
CPC ............ *H04W 24/02* (2013.01); *H04W 76/20* (2018.02)

(58) Field of Classification Search
CPC ............................... H04W 24/02; H04W 76/02
See application file for complete search history.

(56) References Cited

U.S. PATENT DOCUMENTS 12,225,556 B2 * 2/2025 Qi .................. H04L 12/189
2015/0003315 A1   1/2015 Chen et al.
(Continued)

FOREIGN PATENT DOCUMENTS

CN   102083006 A   6/2011
CN   107979853 A   5/2018
(Continued)

OTHER PUBLICATIONS

European Search Report dated Apr. 2, 2024 for European Patent Application No. 20946312.4.
(Continued)

*Primary Examiner* — Erika A Washington
(74) *Attorney, Agent, or Firm* — AMPACC Law Group, PLLC

(57) ABSTRACT

Embodiments of the present application relate to a method and apparatus for multicast and broadcast services (MBS). An exemplary method includes: determining an association identity (ID) for associating a common layer entity with a first lower layer entity for a multicast data radio bearer (M-DRB) and a second lower layer entity for a unicast data radio bearer (U-DRB); and transmitting configuration information including the association ID. Embodiments of the present application can support dynamic change between the point to multipoint (PTM) mode mode and the point to point (PTP) mode mode while providing lossless and seamless transitions and/or handover between the PTM mode and the PTP mode.

20 Claims, 12 Drawing Sheets

(56) References Cited

U.S. PATENT DOCUMENTS

| | | | | |
|---|---|---|---|---|
| 2020/0323024 A1* | 10/2020 | Huang | ............... | H04L 12/185 |
| 2021/0378053 A1* | 12/2021 | Saily | ................. | H04W 76/40 |
| 2022/0095396 A1* | 3/2022 | Luo | .................. | H04W 76/12 |
| 2022/0132627 A1 | 4/2022 | Huang et al. | | |

FOREIGN PATENT DOCUMENTS

| | | | |
|---|---|---|---|
| CN | 109982266 | A | 7/2019 |
| CN | 110536487 | A | 12/2019 |
| CN | 110972103 | A | 4/2020 |
| EP | 3852403 | A1 | 7/2021 |
| IN | 201741028700 | A | 2/2019 |
| IN | 201947016318 | A | 5/2019 |
| WO | 2019223780 | A1 | 11/2019 |

OTHER PUBLICATIONS

Huawei et al. "WID revision: NR Multicast and Broadcast Services" 3GPP TSG RAN Meeting #88-e RP-201038, Jul. 3, 2020; pp. 1-6.
International Search Report and Written Opinion dated Apr. 22, 2021 for International Application No. PCT /CN2020/104478.

* cited by examiner

METHOD AND APPARATUS FOR MULTICAST AND BROADCAST SERVICES

CROSS REFERENCE TO RELATED APPLICATIONS

This application is a national phase entry of International Application No. PCT/CN2020/104478, filed on Jul. 24, 2020, entitled METHOD AND APPARATUS FOR MULTICAST AND BROADCAST SERVICES, which is incorporated by reference in its entirety.

TECHNICAL FIELD

Embodiments of the present application generally relate to wireless communication technology, especially to a method and apparatus for multicast and broadcast services (MBS).

BACKGROUND

In new radio (NR) Rel-17, the MBS plans to focus on a small area mixed mode multicast (also referred to as Objective A in the TR 23.757). The Objective A is about enabling general MBS services over 5G system (5GS) and the identified use cases that could benefit from this feature. These use cases include but are not limited to: public safety and mission critical, vehicle to everything (V2X) applications, transparent internet protocol version 4 (IPv4)/internet protocol version 6 (IPv6) multicast delivery, internet protocol television (IPTV), software delivery over wireless, group communications and internet of things (IoT) applications. In these use cases, the requirements for service continuity and reliability have changed. In order to support the above requirements, one objective introduced in RP-201038 is: specify support for dynamic change of Broadcast/Multicast service delivery between multicast (for example, point to multipoint (PTM) mode) and unicast (for example, point to point (PTP) mode) with service continuity for a given user equipment (UE).

Given the above, the industry desires an improved technology for multicast and broadcast services, so as to support dynamic change between the PTM mode and the PTP mode while providing lossless and seamless transitions and/or handover between the PTM mode and the PTP mode.

SUMMARY OF THE APPLICATION

Some embodiments of the present application at least provide a technical solution for multicast and broadcast services.

According to some embodiments of the present application, a method may include: determining an association identity (ID) for associating a common layer entity with a first lower layer entity for a multicast data radio bearer (M-DRB) and a second lower layer entity for a unicast data radio bearer (U-DRB); and transmitting configuration information including the association ID.

According to some other embodiments of the present application, a method may include: receiving configuration information including an association ID for associating a common layer entity with a first lower layer entity for a M-DRB and a second lower layer entity for a U-DRB; and configuring at least one of the common layer entity, the first lower layer entity, and the second lower layer entity based on the configuration information.

According to some other embodiments of the present application, an apparatus may include: a common packet data convergence protocol (PDCP) entity; a first radio link control (RLC) entity for a M-DRB; and at least one second RLC entity, wherein each of the at least one second RLC entity is associated with a U-DRB of a UE.

According to some other embodiments of the present application, an apparatus may include: a common PDCP entity; a first RLC entity for an M-DRB; and a second RLC entity for a U-DRB, wherein the common PDCP entity is associated with the first RLC entity and the second RLC entity.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for for multicast and broadcast services. Accordingly, embodiments of the present application can support dynamic change between the PTM mode and the PTP mode while providing lossless and seamless transitions and/or handover between the PTM mode and the PTP mode.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present application are also applicable to similar technical problems.

Figure 1:
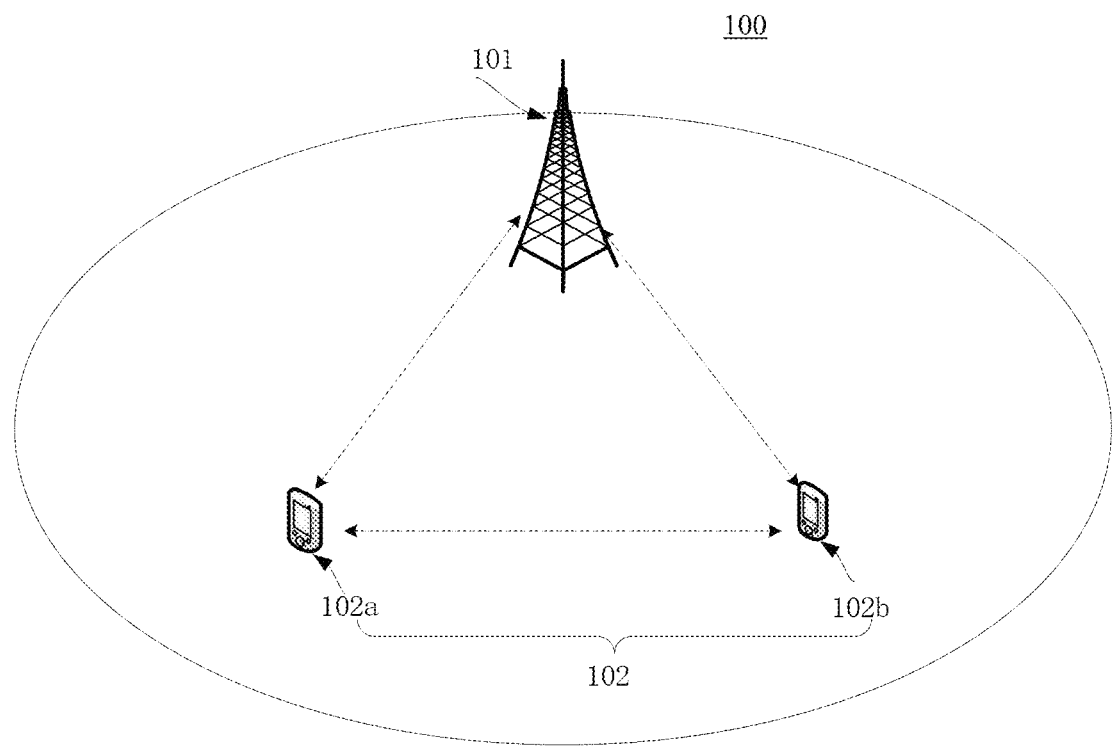
FIG. 1 is a schematic diagram illustrating an exemplary wireless communication system 100 according to some embodiments of the present application.

FIG. 1 is a schematic diagram illustrating an exemplary wireless communication system 100 according to an embodiment of the present application.

As shown in FIG. 1, a wireless communication system 100 includes at least one BS 101 and at least one UE 102. In particular, the wireless communication system 100 includes one BS 101 and two UEs 102 (e.g., UE 102*a* and UE 102*b*) for illustrative purpose. Although a specific number of BS 101 and UEs 102 are depicted in FIG. 1, it is contemplated that any number of BSs 101 and UEs 102 may be included in the wireless communication system 100.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 102(*s*) may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 102(*s*) may include wearable devices, such as smart watches, fitness bands, optical head-mounted displays, or the like. Moreover, the UE 102(*s*) may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may transmit a same MBS data to the UE 102*a* and UE 102*b*. For example, the MBS data may be transmitted to the UE 102*a* and UE 102*b* via a PTM mode. In another example, the MBS data may be respectively transmitted to the UE 102*a* and UE 102*b* via a PTP mode. In NR Rel-17, one objective is specifying support for dynamic change of Broadcast/Multicast service delivery between multicast (PTM) and unicast (PTP) with service continuity for a given UE. In order to support a dynamic and seamless and lossless switching between the PTM transmission and the PTP transmission, a radio access network (RAN) based solution needs to be considered. The RAN based solution should solve the following problems: 1) how to support dynamic change of PTM mode and PTP mode within RAN; and 2) How to provide lossless and seamless transitions and/or handover between PTM mode and PTP mode within RAN.

Accordingly, embodiments of the present application provides a technical solution for MBS, which can support dynamic change between the PTM mode and the PTP mode while providing lossless and seamless transitions and/or handover between the PTM mode and the PTP mode. More details on embodiments of the present application will be illustrated in the following text in combination with the appended drawings.

Figure 2:
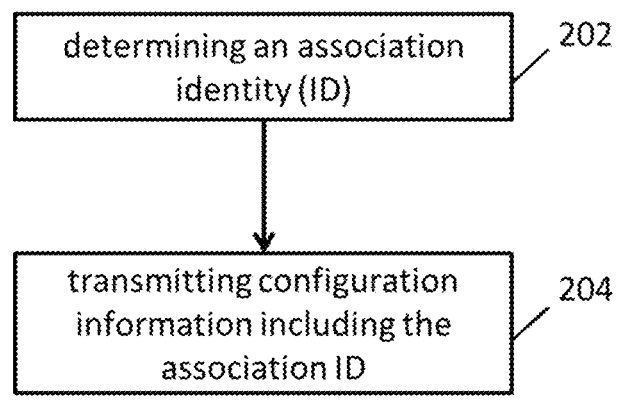
FIG. 2 is a flow chart illustrating a method for MBS according to some other embodiments of the present application.

FIG. 2 is a flow chart illustrating a method for MBS according to some embodiments of the present application. The method may be performed by a BS (e.g., a BS 101 as shown in FIG. 1).

In the exemplary method shown in FIG. 2, in step 202, a BS 101 may determine an association ID for associating a common layer entity with a first lower layer entity, such as a lower layer entity for a M-DRB, and a second lower layer entity, such as a lower layer entity for a U-DRB. In some embodiments, the first lower layer entity may refer to a lower layer entity for a U-DRB, and the second lower layer entity, such as a lower layer entity for an M-DRB. In some embodiments, the association ID may also be used for associating the M-DRB and the U-DRB. For example, the association ID is used for associating a multicast RLC bearer and a unicast RLC bearer, wherein the multicast RLC bearer and the unicast RLC bearer may have the same common layer entity.

The M-DRB may refer to a radio bearer or an RLC bearer for data transmission via a PTM mode. The M-DRB is scrambled by a group radio network temporary identifier (G-RNTI) in at least one cell. The M-DRB can also be named as multicast radio bearer (MRB). The U-DRB may refer to a radio bearer or an RLC bearer for data transmission via a PTP mode. The U-DRB is scrambled by a cell radio network temporary identifier (C-RNTI). The U-DRB can also be named as data radio bearer (DRB). It is also possible to consider same way for singling radio bearer (SRB). For example, the M-DRB can be replaced by M-SRB, which may refer to a radio bearer or an RLC bearer for signaling transmission via a PTM mode. The U-DRB can be replaced by U-SRB, which may refer to a radio bearer or an RLC bearer for signaling transmission via a PTP mode.

After determining the association ID, in step 204, the BS 101 may transmit configuration information including the association ID to a UE 102 (e.g., a UE 102a or a UE 102b). According to some embodiments of the present application, the configuration information may include at least one of: information for configuring the common layer entity, information for configuring the first lower layer entity, and information for configuring the second lower layer entity. With the associated ID, the common layer entity, the first lower layer entity, and the second lower layer entity are associated for data transmission of a same MBS traffic.

According to some embodiments of the present application, the association ID may be transmitted to a UE 102 in a radio resource control (RRC) reconfiguration message.

According to some embodiments of the present application, the common layer entity may include a sequence numbering function. The sequence numbering function may include at least one of following functions: sequence number allocation for each packet, packets re-ordering and packet duplication.

According to some embodiments of the present application, the common layer may include a PDCP entity, the first lower layer entity may include a first RLC entity, and the second lower layer entity may include a second RLC entity.

In an embodiment of the present application, the association ID may include one of the followings: an M-DRB ID, a U-DRB ID, a logical channel ID (LCID), a temporary mobile group identifier (TMGI), a G-RNTI; and any other ID (for example, a new ID different from the above IDs) which is used to identify the association. In this embodiment, the association ID should be unique in a cell or in a multicast area including at least one cell. Accordingly, if the association ID is a a U-DRB ID, the U-DRB ID may be a specific U-DRB ID for identifying the association and is different from the U-DRB ID of the UE 102. Similarly, if the association ID is a LCID, the LCID may be a specific LCID for identifying the association and is different from the LCID of the UE 102. For example, the specific LCID index and values may be represented by the following table as specified in 3GPP standard document TS38.321. In the table, each LCID index may have a corresponding identity of the logical channel of MBS.

| Index | LCID values |
|---|---|
| 30-35 | Identity of the logical channel of MBS |

In this embodiment, the association ID may be included in first configuration information for the PDCP entity, in second configuration information or the first RLC entity, and in third configuration information for the second RLC entity.

Figure 3:
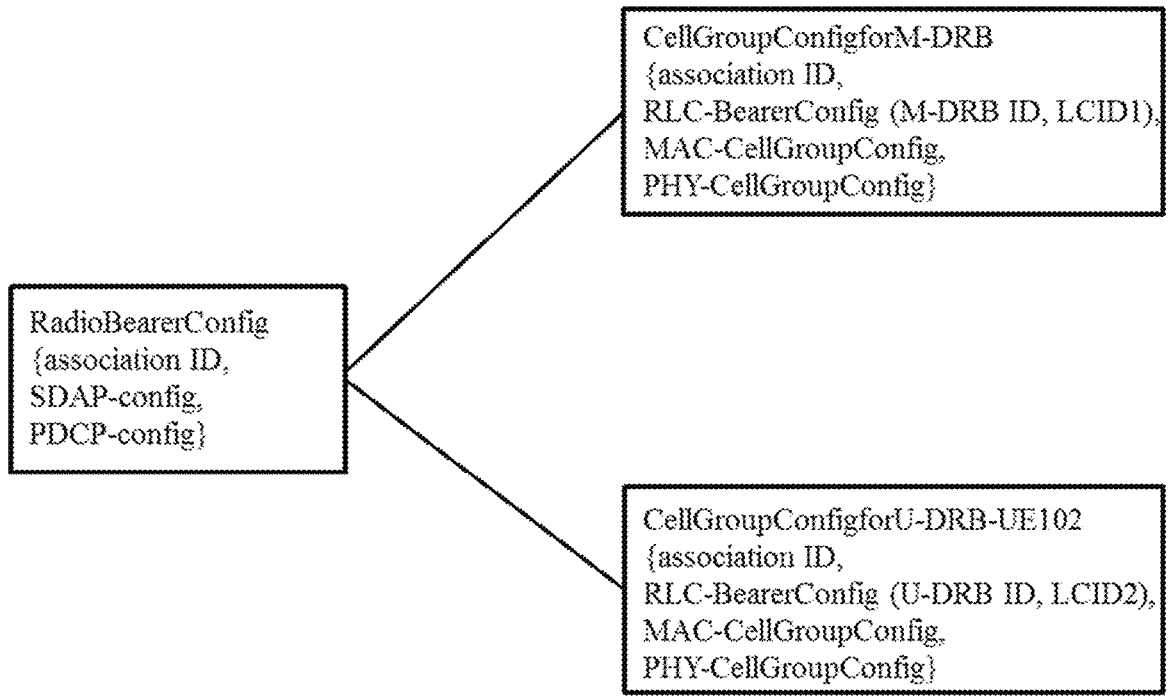
FIG. 3 illustrates an example of configuring an association ID according to some embodiments of the present application.

For example, FIG. 3 illustrates an example of configuring an association ID according to some embodiments of the present application.

As shown in FIG. 3, the first configuration information for the PDCP entity may be a RadioBearerConfig information element (IE) which at least includes a SDAP-config for configuring service data adaptation protocol (SDAP) and a PDCP-config for configuring the PDCP.

The second configuration information for the first RLC entity may be a CellGroupConfigforM-DRB IE, which includes a RLC-BearerConfig (M-DRB ID, LCID1) for configuring the first RLC entity for the M-DRB, a MAC-CellGroupConfig for configuring a medium access control (MAC) layer for the M-DRB, and a PHY-CellGroupConfig for configuring a PHY layer for the M-DRB.

The third configuration information for the second RLC entity may be a CellGroupConfigforU-DRB-UE102 IE, which includes a RLC-BearerConfig (U-DRB ID, LCID2) for configuring the second RLC entity for the U-DRB, a MAC-CellGroupConfig for configuring a MAC layer for the U-DRB, and a PHY-CellGroupConfig for configuring a PHY layer for the U-DRB.

As shown in FIG. 3, all of the RadioBearerConfig IE, the CellGroupConfigforM-DRB IE, and the CellGroupConfigforU-DRB-UE102 IE include the association ID, such that the UE 102 may associate the PDCP entity with the first RLC and the second RLC after receiving the above three IEs and furthermore the UE 102 may also associate the first RLC and the second RLC.

According to the above embodiment of the present application, the RadioBearerConfig IE and CellGroupConfig IE as specified in 3GPP standard documents may change. For example, the association ID may be added to the above two IEs as follows.

| RadioBearerConfig IE |
|---|
| -- ASN1START<br>-- TAG-RADIOBEARERCONFIG-START<br>RadioBearerConfig ::=       SEQUENCE {<br>mrb-ToAddModList              MRB-ToAddModList<br>OPTIONAL,<br>...<br>}<br>MRB-ToAddModList ::=     SEQUENCE (SIZE (1..maxDRB)) OF<br>MRB-ToAddMod<br>MRB-ToAddMod ::=         SEQUENCE {<br>   AssociationID            INTEGER (0..xxxx),<br>   pdcp-Config              PDCP-Config   OPTIONAL,<br>-- Cond PDCP<br>}|

| CellGroupConfig IE |
|---|
| CellGroupConfig ::=          SEQUENCE {<br>  rlc-BearerToAddModList     SEQUENCE (SIZE(1..maxLC-ID)) OF<br>RLC-BearerConfig   PTIONAL,<br>RLC-BearerConfig ::=         SEQUENCE {<br>  logicalChannelIdentity       LogicalChannelIdentity,<br>  AssociationID              INTEGER (0..xxxx),<br>...<br>} |

In another embodiment of the present application, the association ID may include an M-DRB ID of the M-DRB and a U-DRB ID of the U-DRB. In this embodiment, the BS 101 may use the M-DRB ID and the U-DRB ID of the UE 102 as the association ID.

In this embodiment, the association ID may be included in fourth configuration information for the PDCP entity and in fifth configuration information for the first RLC entity and the second RLC entity.

In an embodiment of the present application, the fourth or fifth configuration information may include an activation indication indicating whether the M-DRB, the U-DRB or both are used. In another embodiment of the present application, the fourth or fifth configuration information may include a switch indication indicating switching from the M-DRB to the U-DRB or switching from the U-DRB to the M-DRB.

Figure 4:
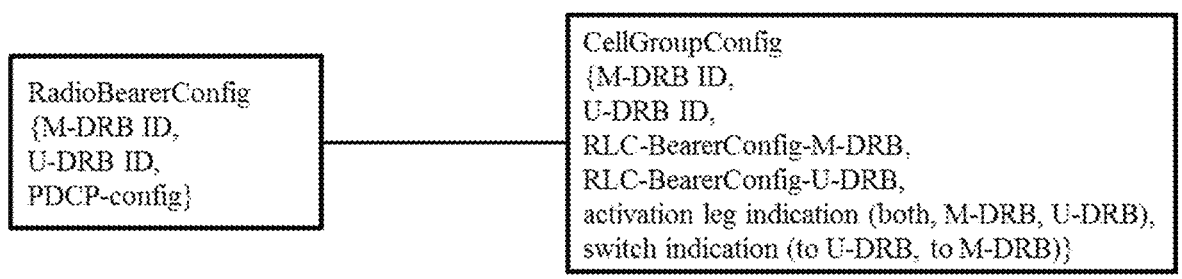
FIG. 4 illustrates another example of configuring an association ID according to some embodiments of the present application.

For example, FIG. 4 illustrates an example of configuring an association ID according to some embodiments of the present application.

As shown in FIG. 4, the fourth configuration information for the PDCP entity may be a RadioBearerConfig IE which at least includes a PDCP-config for configuring the PDCP entity.

The fifth configuration information for the first RLC entity and the second RLC entity may be a CellGroupConfig IE, which at least includes a RLC-BearerConfig-M-DRB for configuring the first RLC entity for the M-DRB and a RLC-BearerConfig-U-DRB for configuring the second RLC entity for the U-DRB.

As shown in FIG. 4, both the RadioBearerConfig IE and the CellGroupConfig IE include the M-DRB ID of the M-DRB and a U-DRB ID of the U-DRB as the association ID, such that the UE 102 may associate the PDCP entity with the first RLC and the second RLC after receiving the above IEs.

In the example of FIG. 4, the CellGroupConfig IE also includes an activation leg indication (both, M-DRB, U-DRB) for indicting whether the M-DRB, the U-DRB or both are used. Moreover, the CellGroupConfig IE also includes a switch indication (to U-DRB, to M-DRB) for indicating switching from the M-DRB to the U-DRB or switching from the U-DRB to the M-DRB.

According to the above embodiment of the present application, the RadioBearerConfig IE and CellGroupConfig IE as specified in 3GPP standard documents may change. For example, the association ID may be added to the RadioBearerConfig IE as follows.

| RadioBearerConfig information element | |
|---|---|
| MRB-ToAddMod ::= | SEQUENCE { |
| AssociationID | SEQUENCE { |
| mRB-ID | MRB-ID/LCID, |
| dRB-ID | DRB-ID/LCID |
| } | |
| pdcp-Config | PDCP-Config  OPTIONAL, |
| -- Cond PDCP | |

In yet another embodiment of the present application, the CellGroupConfig IE may only include a RLC-BearerConfig-M-DRB IE or a RLC-BearerConfig-U-DRB IE. If only the RLC-BearerConfig-M-DRB IE is configured, the UE shall use the M-DRB with the corresponding configuration such as PDCP-Config and RLC-BearerConfig-M-DRB to receive the data transmission. If only the RLC-BearerConfig-U-DRB IE is configured, the UE shall use the DRB with the corresponding configuration such as PDCP-Config and RLC-BearerConfig-U-DRB to receive the data transmission.

According to some other embodiments of the present application, the common layer may include at least one of a PDCP entity, a RLC entity, and a MAC entity, the first lower layer entity may include a first physical (PHY) entity, and the second lower layer entity may include a second PHY entity. It is also possible that the common layer may include at least one of PDCP entity, a RLC entity, a MAC entity and a higher part of PHY entity, and the first lower layer entity may include a first lower part of PHY entity, and the second lower layer entity may include a second lower part of PHY entity.

In an embodiment of the present application, the association ID may be included in sixth configuration information for a radio bearer and in seventh configuration information for a cell group.

Figure 5:
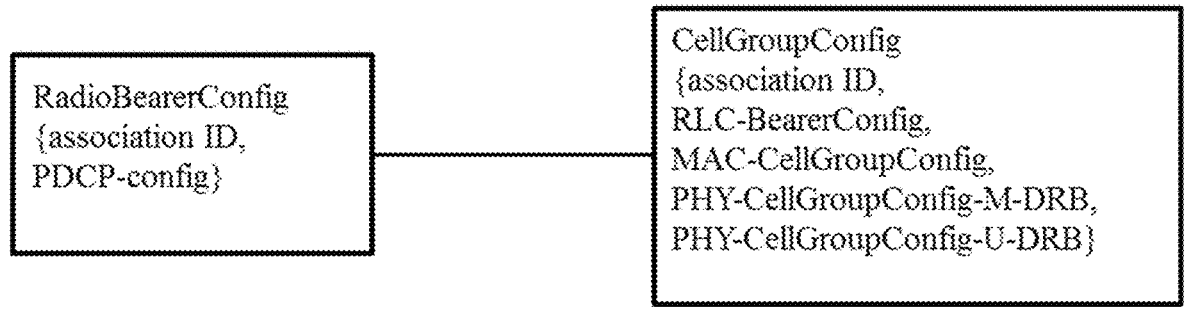
FIG. 5 illustrates another example of configuring an association ID according to some embodiments of the present application.

For example, FIG. 5 illustrates an example of configuring an association ID according to some embodiments of the present application.

As shown in FIG. 5, the sixth configuration information for the radio bearer may be a RadioBearerConfig IE which at least includes a PDCP-config for configuring the PDCP entity.

The seventh configuration information for the cell group may be a CellGroupConfig IE, which at least includes a RLC-BearerConfig IE for configuring the RLC entity, a MAC-CellgroupConfig IE for configuring the MAC entity, a PHY-CellGroupConfig-M-DRB IE for configuring the first physical entity for the M-DRB and a PHY-CellGroupConfig-U-DRB IE for configuring the second physical entity for the U-DRB.

As shown in FIG. 5, both the RadioBearerConfig IE and the CellGroupConfig IE include the association ID (for example, the M-DRB ID or a specific LCD), such that the UE 102 may associate at least one of a PDCP entity, a RLC entity, and a MAC entity with the two physical entities after receiving the above IEs.

According to some embodiments of the present application, the BS 101 may include: a common layer entity; a first lower entity for a M-DRB; and at least one second lower layer entity, wherein each of the at least one second lower layer entity is associated with a U-DRB of a UE, wherein the common layer entity is associated with the first lower entity for the M-DRB and the at least one second lower entity.

In an embodiment of the present application, the common layer entity may include at least one of a PDCP entity, a RLC entity, and a MAC entity, the first lower layer entity may include a first PHY layer, and the at least one second lower entity may include at least one second PHY entity. In this embodiment, the BS 101 may include: a PDCP entity, a RLC entity, a MAC entity, a PHY entity for an M-DRB; and at least one PHY entity for at least one U-DRB, wherein each of the at least one PHY entity is associated with a U-DRB of a UE. It is also possible that the common layer may include at least one of PDCP entity, a RLC entity, a MAC entity and a higher part of PHY entity, and the first lower layer entity may include a first lower part of PHY entity, and the at least one second lower layer entity may include at least one second lower part of PHY entity.

Figure 6:
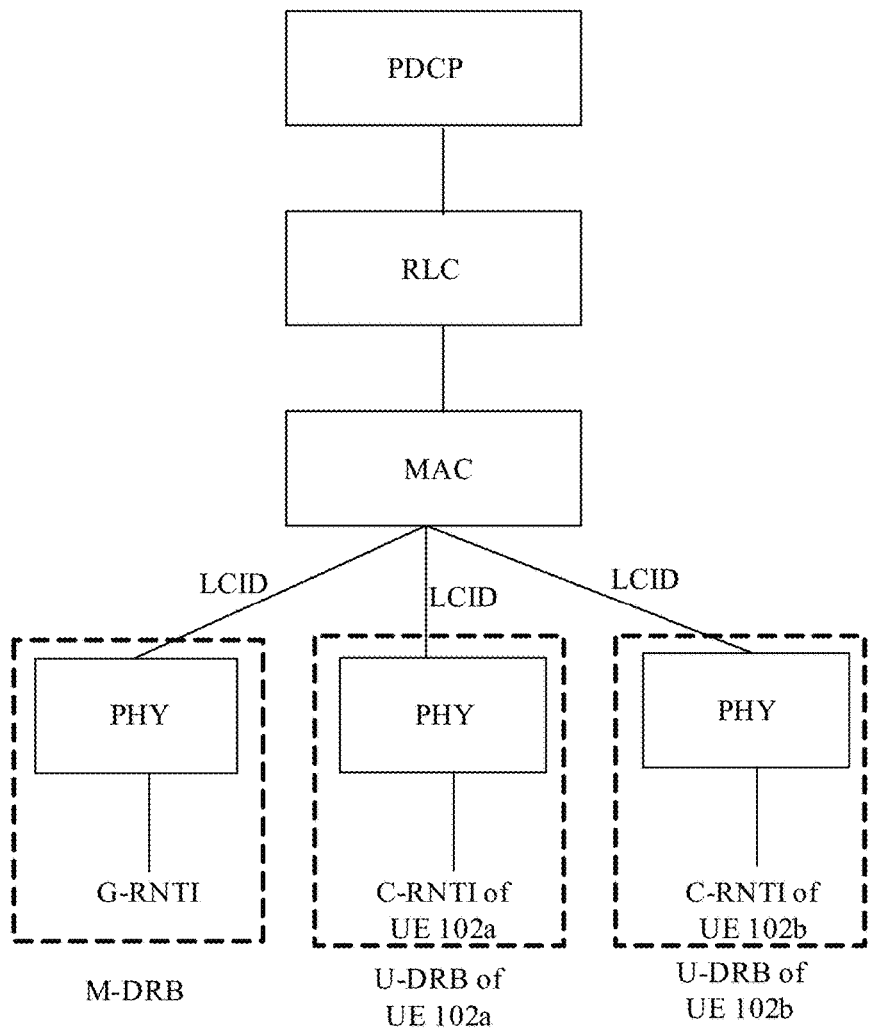
FIG. 6 illustrates an example of a protocol structure of a BS according to some embodiments of the present application.

For example, FIG. 6 illustrates an example of a protocol structure of a BS according to some embodiments of the present application.

As shown in FIG. 6, the protocol structure of a BS (e.g., BS 102) may include a PDCP entity, a RLC entity, and a MAC entity. The PDCP entity, RLC entity, and the MAC entity may be associated with a PHY entity for an M-DRB and two PHY entities for two U-DRBs, where one PHY entity is associated with a U-DRB of UE 102a, and the other PHY entity is associated with a U-DRB of UE 102b. In FIG. 6, the M-DRB, the U-DRB of UE 102a, and the U-DRB of UE 102b may have a same LCID, for example, a specific LCID which can be used for both the M-DRB and all the U-DRB(s). In the physical layer, the M-DRB is scrambled by a G-RNTI, the U-DRB of UE 102a is scrambled by a C-RNTI of UE 102*a*, and the U-DRB of UE 102*b* is scrambled by a C-RNTI of UE 102*b*.

In yet another embodiment of the present application, the common layer entity may include a PDCP entity, the first lower layer entity may include a first RLC entity, and the at least one second lower entity may include at least one second RLC entity. In this embodiment, the BS 101 may include: a common PDCP entity; a RLC entity for an M-DRB; and at least one RLC entity for at least one U-DRB, wherein each of the at least one RLC entity is associated with a U-DRB of a UE.

Figure 7:
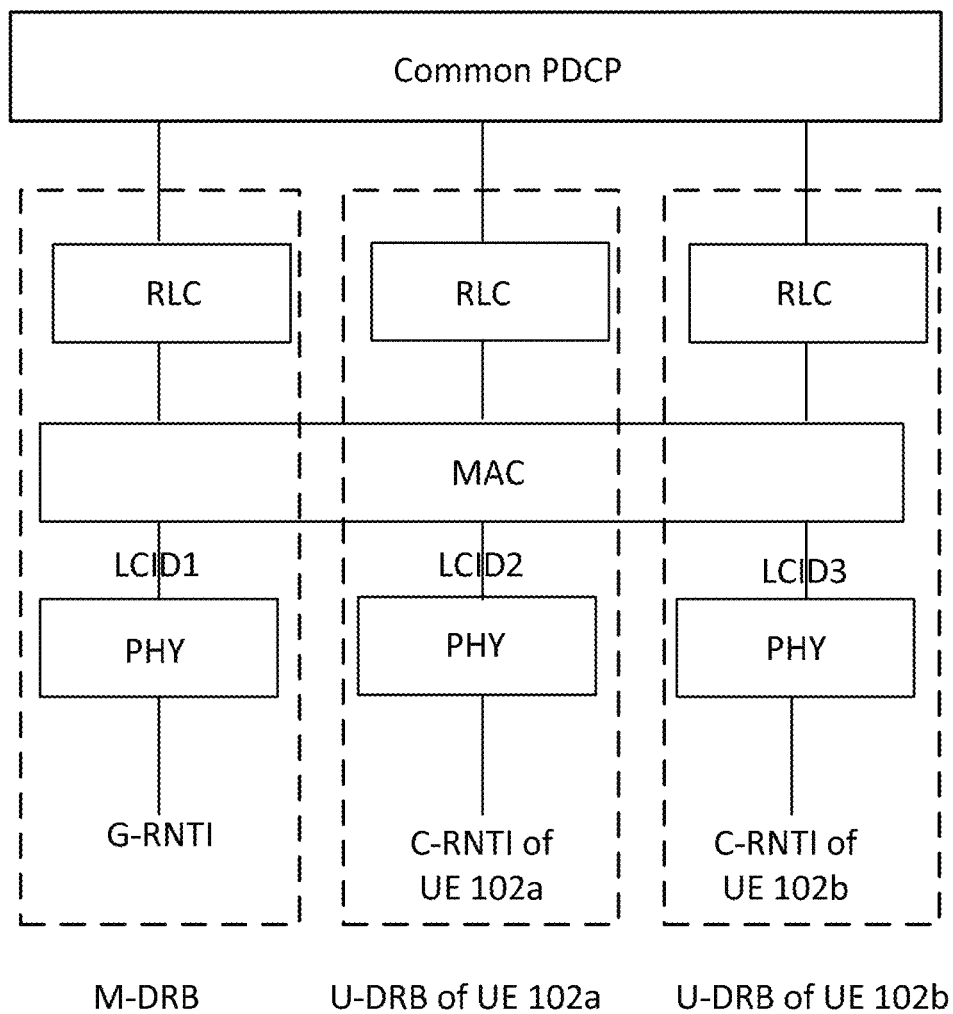
FIG. 7 illustrates another example of a protocol structure of a BS according to some other embodiments of the present application.

For example, FIG. 7 illustrates an example of a protocol structure of a BS according to some embodiments of the present application.

As shown in FIG. 7, the protocol structure of a BS (e.g., BS 102) may include a common PDCP entity, the common PDCP entity may be associated with one RLC entity for an M-DRB and two RLC entities for two U-DRBs, one RLC entity is associated with a U-DRB of UE 102*a*, the other RLC entity is associated with a U-DRB of UE 102*b*. Each of the three RLC entities may be associated with a corresponding PHY entity.

In FIG. 7, the protocol structure of the BS 102 may include one MAC entity. The M-DRB has a specific LCID (for example, LCID1), which is unique in a cell or in a multicast area (e.g., a list of cells) including at least one cell. Each U-DRB may have a corresponding LCID. For example, the U-DRB of UE 102*a* may have a LCID2, the U-DRB of UE 102*b* may have a LCID3. In the physical layer, the M-DRB is scrambled by a G-RNTI, the U-DRB of UE 102*a* is scrambled by a C-RNTI of UE 102*a*, and the U-DRB of UE 102*b* is scrambled by a C-RNTI of UE 102*b*. In some other embodiments, the M-DRB, U-DRB of UE 102*a*, and U-DRB of UE 102*b* may have a same specific LCID.

Persons skilled in the art can understand that two RLC entities for two UEs are only for illustrative purposes. According to some other embodiments of the present application, the BS 101 may have at least one RLC entity, each RLC entity is associated with a U-DRB of a UE, has a corresponding LCID, and is associated with a PHY entity.

In the above embodiments, a common PDCP entity is used for M-DRB and at least one U-DRB. The biggest advantage of the common PDCP entity which has a same sequence numbering function is to provide the service continuity when switching between the M-DRB and the U-DRB.

In order to provide lossless switching between M-DRB and U-DRB, some embodiments of the present application provides the functionalities of the common PDCP entity.

In an embodiment of the present application, the common PDCP entity may first allocate a COUNT value or a sequence number for a PDCP service data unit (SDU). Then, the common PDCP entity may duplicate the PDCP SDU into a plurality of PDCP SDUs, wherein the plurality of PDCP SDUs may include a first PDCP SDU for the M-DRB and at least one second PDCP SDU for at least one U-DRB, and wherein each of the at least one second PDCP SDU is associated a U-DRB of a UE.

After that, in the case that a header compression function is configured in the common PDCP entity, the common PDCP entity may perform a head compression to each of the plurality of PDCP SDUs.

In the case a security function is configured for each U-DRB, for each of the at least one second PDCP SDU, the common PDCP entity may use the COUNT value or the sequence number, a security algorithm, and key of a UE associated with a PDCP SDU to perform an integrity protection and/or a ciphering for the PDCP SDU to generate a secured PDCP SDU.

After generating at least one secured PDCP SDU, the common PDCP entity may add the COUNT value or the sequence number to the first PDCP SDU to generate a first PDCP protocol data unit (PDU) for the M-DRB, add the COUNT value or the sequence number to each of the at least one secured PDCP SDU to generate at least one second PDCP PDU for the at least one U-DRB. After that, the common PDCP entity may submit the first PDCP PDU to a RLC entity for the M-DRB, and submit each of the at least one second PDCP PDU to a RLC entity for a U-DRB of the at least one U-DRB.

Figure 8:
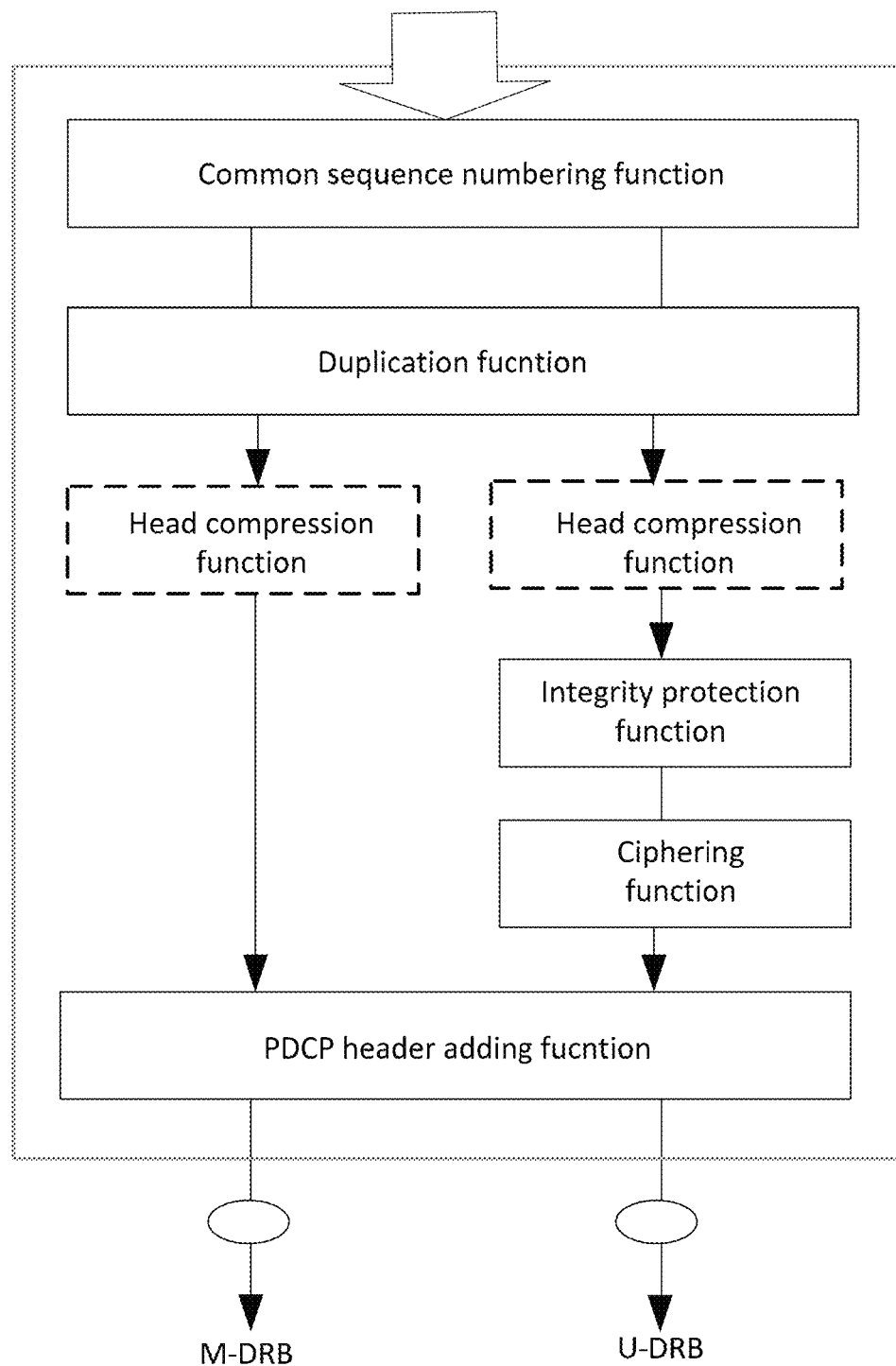
FIG. 8 illustrates an example of a PDCP entity of a BS according to some embodiments of the present application.

For example, FIG. 8 illustrates an example of a PDCP entity of a BS (for example, the BS 102) according to some embodiments of the present application. In the example of FIG. 8, the common PDCP entity is used for an M-DRB and a U-DRB of a UE 102 (e.g., UE 102*a* or UE 102*b*). In addition, in the example of FIG. 8, the security function is configured for the U-DRB.

As shown in FIG. 8, the PDCP entity may include the following functionalities (also referred to as functional modules).

Common sequence numbering function: for a PDCP SDU received from an upper layer than the PDCP layer, the common sequence numbering function may allocate a COUNT value or sequence number for it. In an embodiment of the present application, the COUNT value or sequence number may be continuous for a sequence of PDCP SDUs.

Duplication function: the duplication function may duplicate the PDCP SDU into two PDCP SDUs (named PDCP SDU A and PDCP SDU B), the PDCP SDU A is used for the M-DRB, and the PDCP SDU B is used for the U-DRB of the UE 102.

Head compression function: the head compression function is an optional function. In the case that it is configured in the common PDCP entity, the head compression may be performed for the PDCP SDU A and the PDCP SDU B. In the case that it is not configured in the common PDCP entity, the common PDCP entity will not perform the head compression for the PDCP SDU A and the PDCP SDU B.

Security function (for example, integrity protection function and/or ciphering function): the security function may perform integrity protection and ciphering of the PDCP SDU B using the COUNT value or the sequence number associated with the PDCP SDU B, the security algorithm and key of the UE 102. After that, the PDCP SDU B is changed to a secured PDCP SDU B.

Since the security function is not configured for the M-DRB, the PDCP entity will skip the integrity protection and ciphering for the PDCP SDU A.

PDCP head adding function: the PDCP head adding function may add the same COUNT value or sequence number in the header of the PDCP SDU A and the secured PDCP SDU B. With the header, the PDCP SDU A is changed to be a PDCP PDU A and the secured PDCP SDU B is changed to be PDCP PDU B.

Then, PDCP entity may submit the PDCP PDU A to the associated RLC entity of the M-DRB, and submits the PDCP PDU B to the associated RLC entity of the U-DRB of the UE 102.

Figure 9:
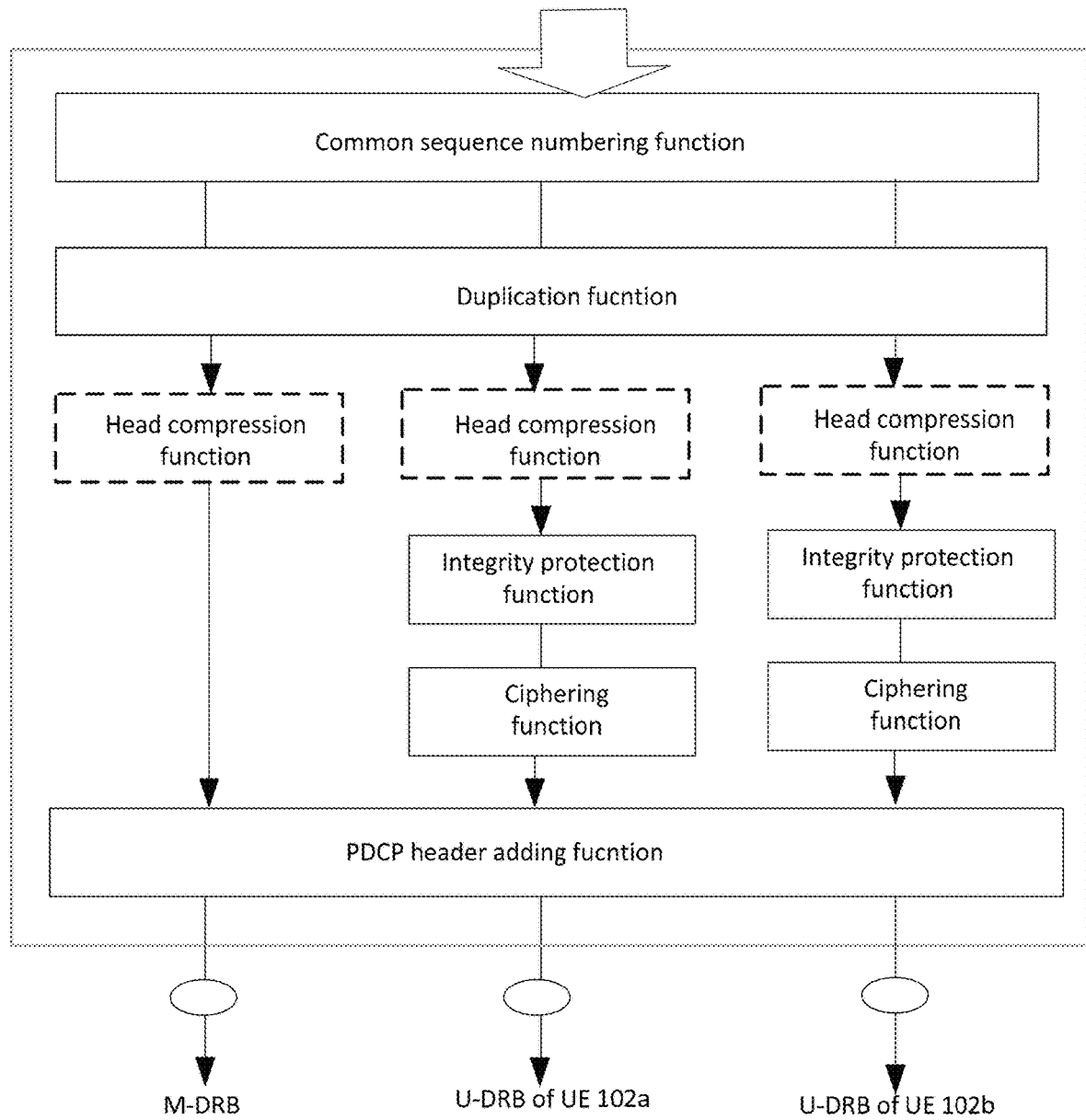
FIG. 9 illustrates another example of a PDCP entity of a BS according to some embodiments of the present application.

FIG. 9 illustrates another example of a PDCP entity of a BS (for example, the BS 102) according to some embodiments of the present application. Different from the example of FIG. 8, the common PDCP entity is used for an M-DRB and at least one U-DRB for at least one UE (e.g., a U-DRB of a UE 102*a* and a U-DRB of a UE 102*b*). In addition, in the example of FIG. 9, the security function is configured for each U-DRB of the at least one U-DRB.

As shown in FIG. 9, the PDCP entity may include the following functionalities (also referred to as functional modules).

Common sequence numbering function: for a PDCP SDU received from an upper layer than the PDCP layer, the common sequence numbering function may allocate a COUNT value or sequence number for it. In an embodiment of the present application, the COUNT value or sequence number may be continuous for a sequence of PDCP SDUs.

Duplicating function: the duplicating function may duplicate the PDCP SDU is into three PDCP SDUs (named PDCP SDU A, PDCP SDU B, and PDCP SDU C), the PDCP SDU A is used for the M-DRB, the PDCP SDU B is used for the U-DRB of the UE 102*a*, and the PDCP SDU C is used for the U-DRB of the UE 102*b*.

Head compression function: the head compression function is an optional function. In the case that it is configured in the common PDCP entity, the head compression may be performed for the PDCP SDU A, the PDCP SDU B, and the PDCP SDU C. In the case that it is not configured in the common PDCP entity, the common PDCP entity will not perform the head compression for the PDCP SDU A, the PDCP SDU B, and the PDCP SDU C.

Security function (for example, integrity protection function and/or ciphering function): the security function may perform integrity protection and ciphering of the PDCP SDU B using the COUNT value or the sequence number associated with the PDCP SDU B, the security algorithm and key of the UE 102*a*, and perform integrity protection and ciphering of the PDCP SDU C using the COUNT value or the sequence number associated with the PDCP SDU C, the security algorithm and key of the UE 102*b*. Then, the PDCP SDU B is changed to a secured PDCP SDU B, the PDCP SDU C is changed to a secured PDCP SDU C.

Since the security function is not configured for the M-DRB, the PDCP entity will skip the integrity protection and ciphering for the PDCP SDU A. PDCP head adding function: the PDCP head adding function may add the same COUNT value or sequence number in the header of the PDCP SDU A, the secured PDCP SDU B, and the PDCP SDU C. With the header, the PDCP SDU A is changed to be a PDCP PDU A, the secured PDCP SDU B is changed to be PDCP PDU B, and the secured PDCP SDU C is changed to be PDCP PDU C.

Then, PDCP entity may submit the PDCP PDU A to the associated RLC entity of the M-DRB, submit the PDCP PDU B to the associated RLC entity of the U-DRB of the UE 102*a*, and submit the PDCP PDU C to the associated RLC entity of the U-DRB of the UE 102*b*.

In another embodiment of the present application, the security function may be not configured for each U-DRB. In this embodiment, the common PDCP entity may first allocate a COUNT value or a sequence number for a PDCP SDU.

After that, in the case that a header compression function is configured in the common PDCP entity, the common PDCP entity may perform a head compression to the PDCP SDU.

Then, the common PDCP entity may add the COUNT value or the sequence number associated with the PDCP SDU to generate a PDCP PDU. After that, the common PDCP entity may duplicate the PDCP PDU into a plurality of PDCP PDUs, wherein the plurality of PDCP PDUs includes a first PDCP PDU for the M-DRB and at least one second PDCP PDU for at least one U-DRB, wherein each of the at least one second PDCP PDU is associated with a U-DRB of a UE.

After duplicating the plurality of PDCP PDUs, the common PDCP entity may submit the first PDCP PDU for the M-DRB to a RLC entity for the M-DRB, and submit each of the at least one second PDCP PDU to a RLC entity for a U-DRB of the at least one U-DRB.

Figure 10:
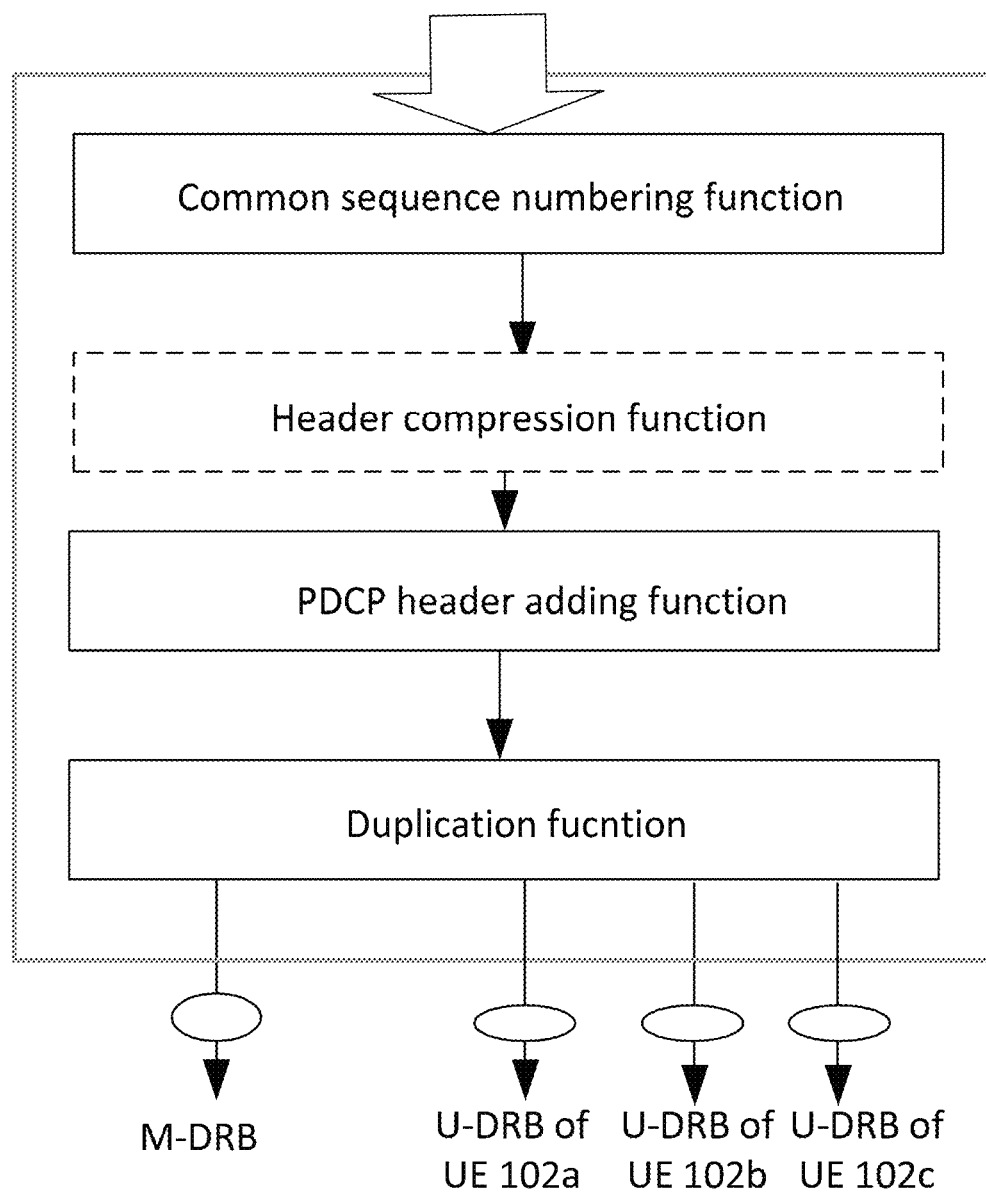
FIG. 10 illustrates yet another example of a PDCP entity of a BS according to some embodiments of the present application.

For example, FIG. 10 illustrates yet another example of a PDCP entity of a BS (for example, the BS 102) according to some embodiments of the present application. In the example of FIG. 10 the common PDCP entity is used for an M-DRB and at least one U-DRB for at least one UE (e.g., a U-DRB of a UE 102*a*, and a U-DRB of a UE 102*b*, and a U-DRB of a UE 102*c* (not shown in FIG. 1)). In addition, in the example of FIG. 10, the security function is not configured for each U-DRB of the at least one U-DRB.

As shown in FIG. 10, the PDCP entity may include the following functionalities (also referred to as functional modules).

Common sequence numbering function: for a PDCP SDU received from an upper layer than the PDCP layer, the common sequence numbering function may allocate a COUNT value or sequence number for it. In an embodiment of the present application, the COUNT value or sequence number may be continuous for a sequence of PDCP SDUs.

Head compression function: the head compression function is an optional function. In the case that it is configured in the common PDCP entity, the head compression may be performed for the PDCP SDU. In the case that it is not configured in the common PDCP entity, the common PDCP entity will not perform the head compression for the PDCP SDU.

PDCP head adding function: the PDCP head adding function may add the COUNT value or sequence number in the header of the PDCP SDU. With the header, the PDCP SDU is changed to be a PDCP PDU.

Duplication function: the duplication function may duplicate the PDCP PDU into four PDCP SDUs (named PDCP PDU A, PDCP PDU B, PDCP PDU C, and PDCP PDU D), the PDCP PDU A is used for the M-DRB, the PDCP PDU B is used for the U-DRB of the UE 102*a*, the PDCP PDU C is used for the U-DRB of the UE 102*b*, and the PDCP PDU D is used for the U-DRB of the UE 102*c*.

Then, PDCP entity may submit the PDCP PDU A to the associated RLC entity of the M-DRB, submit the PDCP PDU B to the associated RLC entity of the U-DRB of the UE 102*a*, submit the PDCP PDU C to the associated RLC entity of the U-DRB of the UE 102*b*, and submit the PDCP PDU D to the associated RLC entity of the U-DRB of the UE 102*c*.

Figure 11:
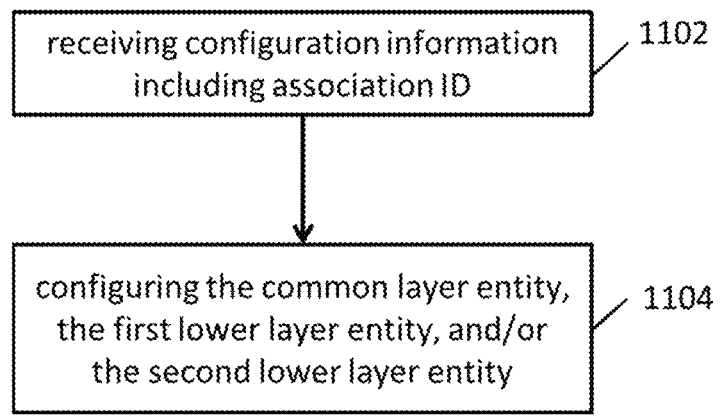
FIG. 11 is a flow chart illustrating a method for MBS according to some other embodiments of the present application.

FIG. 11 is a flow chart illustrating a method for MBS according to some embodiments of the present application. The method may be performed by a UE 102 (e.g., a UE 102*a* or a UE 102*b* as shown in FIG. 1).

In the exemplary method shown in FIG. 11, in step 1102, the UE 102 may receive configuration information including an association ID for associating a common layer entity with a first lower layer entity for a M-DRB and a second lower layer entity for a U-DRB from a BS 101. In some embodiments, the association ID may also be used for associating the M-DRB and the U-DRB. For example, the association ID is used for associating a multicast RLC bearer and a unicast RLC bearer, wherein the multicast RLC bearer and the unicast RLC bearer may have the same common layer entity.

The M-DRB may refer to a radio bearer or a RLC bearer for data transmission via a PTM mode. The M-DRB is scrambled by a G-RNTI in at least one cell. The M-DRB can also be named as MRB. The U-DRB may refer to a radio bearer or a RLC bearer for data transmission via a PTP mode. The U-DRB is scrambled by a C-RNTI. The U-DRB can also be named as DRB. It is also possible to consider same way for singling radio bearer (SRB). For example, the M-DRB can be replaced by M-SRB, which may refer to a radio bearer or an RLC bearer for signaling transmission via a PTM mode. The U-DRB can be replaced by U-SRB, which may refer to a radio bearer or an RLC bearer for signaling transmission via a PTP mode.

According to some embodiments of the present application, the configuration information may include at least one of: information for configuring the common layer entity, information for configuring the first lower layer entity, and information for configuring the second lower layer entity.

According to some embodiments of the present application, the common layer entity may include a sequence numbering function. The sequence numbering function may include at least of following functions: sequence number allocation for each packet, packets re-ordering and packet duplication.

According to some embodiments of the present application, the association ID may be received in a radio resource control (RRC) reconfiguration message.

According to some other embodiments of the present application, the common layer may include a PDCP entity, the first lower layer entity may include a first RLC entity, and the second lower layer entity may include a second RLC entity.

In an embodiment of the present application, the association ID may include one of the followings: an M-DRB ID, a U-DRB ID, a logical channel ID (LCID), a temporary mobile group identifier (TMGI), a G-RNTI; and any other ID (for example, a new ID different from the above IDs) which is used to identify the association. In this embodiment, the association ID should be unique in a cell or in a multicast area including at least one cell. Accordingly, if the association ID is a a U-DRB ID, the U-DRB ID may be a specific U-DRB ID for identifying the association and is different from the U-DRB ID of the UE 102. Similarly, if the association ID is a LCID, the LCID may be a specific LCID for identifying the association and is different from the LCID of the UE 102. For example, the specific LCID index and values may be represented by the following table as specified in 3GPP standard document TS38.321:

| Index | LCID values |
|---|---|
| 30-35 | Identity of the logical channel of MBS |

In this embodiment, the association ID may be included in first configuration information for the PDCP entity, in second configuration information or the first RLC entity, and in third configuration information for the second RLC entity. The specific examples of the first configuration information, second configuration information, and the third configuration information may be referred to FIG. 3.

In another embodiment of the present application, the association ID may include an M-DRB ID of the M-DRB and a U-DRB ID of the U-DRB. In this embodiment, the BS 101 may use the M-DRB ID and the U-DRB ID of the UE 102 as the association ID.

In this embodiment, the association ID may be included in fourth configuration information for the PDCP entity and in fifth configuration information for the first RLC entity and the second RLC entity.

In an embodiment of the present application, the fourth or fifth configuration information may include an activation indication indicating whether the M-DRB, the U-DRB or both are used. In another embodiment of the present application, the fourth or fifth configuration information may include a switch indication indicating switching from the M-DRB to the U-DRB or switching from the U-DRB to the M-DRB.

The specific examples of the fourth configuration information and the fifth configuration information may be referred to FIG. 4.

According to some other embodiments of the present application, the common layer may include at least one of a PDCP entity, a RLC entity, and a MAC entity, the first lower layer entity may include a first physical (PHY) entity, and the second lower layer entity may include a second PHY entity. In an embodiment of the present application, the association ID may be a M-DRB ID of the MRB or a specific LCID. It is also possible that the common layer may include at least one of PDCP entity, a RLC entity, a MAC entity and a higher part of PHY entity, and the first lower layer entity may include a first lower part of physical (PHY) entity, and the second lower layer entity may include a second lower part of PHY entity.

In an embodiment of the present application, the association ID may be included in sixth configuration information for a radio bearer and in seventh configuration information for a cell group. The specific examples of the sixth configuration information and the seventh configuration information may be referred to FIG. 5.

After receiving the configuration information, in step 1104, the UE 102 may configure at least one of the common layer entity, the first lower layer entity, and the second lower layer entity based on the configuration information.

According to some embodiments of the present application, the UE 102 (for example, the UE 102a or the UE 102b) may include: a common layer entity; a first lower entity for a M-DRB; and a second lower layer entity for a U-DRB, wherein the common layer entity is associated with the first lower entity and the second lower entity.

In an embodiment of the present application, the common layer entity may include at least one of a PDCP entity, a RLC entity, and a MAC entity. The first lower layer entity may include a first PHY entity, and the second lower layer entity may include a second PHY entity. In this embodiment of the present application, the UE 102 (for example, the UE 102a or the UE 102b) may include: a PDCP entity, a RLC entity, a MAC entity, a first PHY entity for an M-DRB, and a second PHY entity for a U-DRB, wherein each of the a PDCP entity, a RLC entity, and a MAC entity is associated with the first RLC entity and the second RLC entity. It is also possible that the common layer may include at least one of PDCP entity, a RLC entity, a MAC entity and a higher part of PHY entity, and the first lower layer entity may include a first lower part of PHY entity, and the second lower layer entity may include a second lower part of PHY entity.

Figure 12:
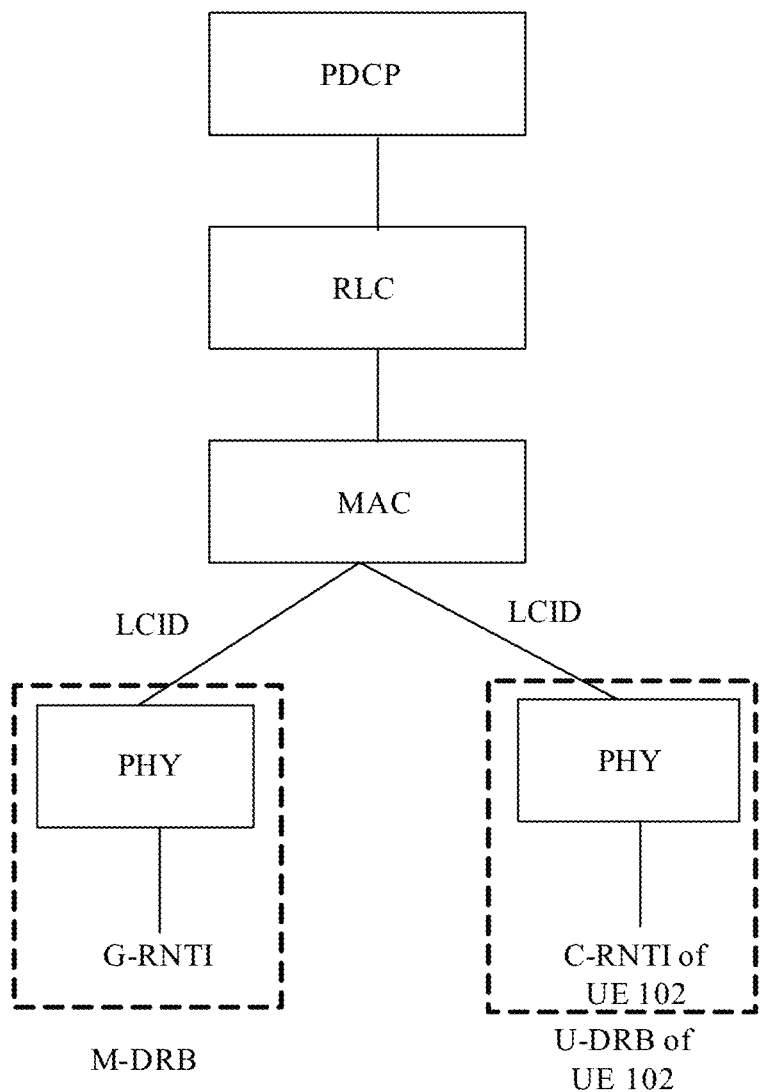
FIG. 12 illustrates an example of a protocol structure of a UE according to some embodiments of the present application.

FIG. 12 illustrates an example of a protocol structure of a UE according to some embodiments of the present application.

As shown in FIG. 12, the protocol structure of a UE 102 (for example the UE 102a or the UE 102b) may include a PDCP entity, a RLC entity, and a MAC layer. The PDCP entity, RLC entity, and the MAC layer may be associated with a PHY entity for an M-DRB and a PHY entity for a U-DRB. It is also possible that the common layer may include at least one of PDCP entity, a RLC entity, a MAC entity and a higher part of PHY entity, and the first lower layer entity may include a first lower part of physical (PHY) entity, and the second lower layer entity may include a second lower part of PHY entity. In FIG. 12, the M-DRB and the U-DRB of UE 102 may have a same LCID, for example, a specific LCID which can be used for both the M-DRB and the U-DRB. In the physical layer, the M-DRB is scrambled by a G-RNTI, and the U-DRB of UE 102 is scrambled by a C-RNTI of UE 102.

In another embodiment of the present application, the common layer entity may include a PDCP entity, the first lower layer entity may include a first RLC entity, and the second lower layer entity may include a second RLC entity. In this embodiment, the UE 102 (for example, the UE 102a or the UE 102b) may include: a common PDCP entity; a first RLC entity for an M-DRB; and a second RLC entity for a U-DRB, wherein the common PDCP entity is associated with the first RLC entity and the second RLC entity.

Figure 13:
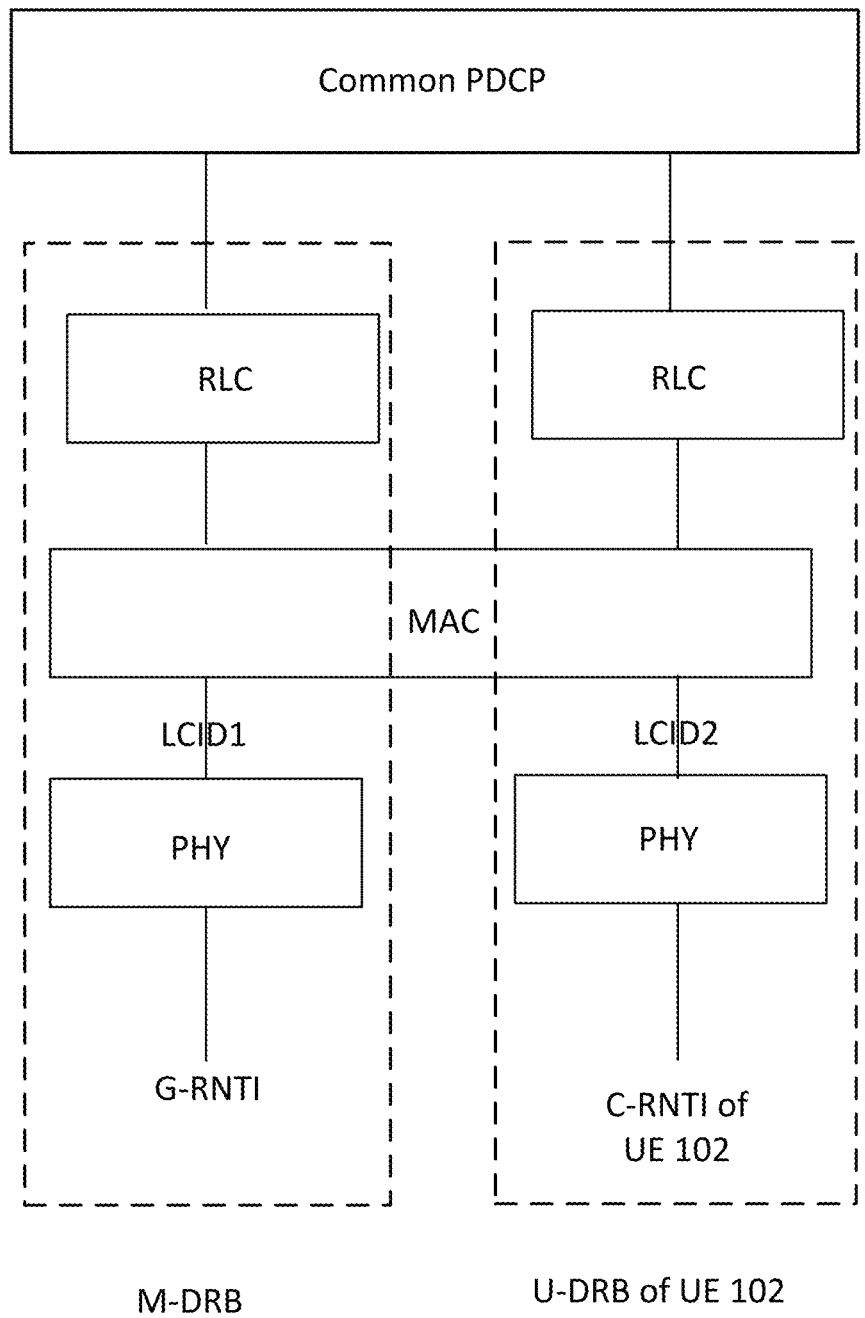
FIG. 13 illustrates another example of a protocol structure of a UE according to some other embodiments of the present application.

For example, FIG. 13 illustrates an example of a protocol structure of a UE according to some embodiments of the present application.

As shown in FIG. 13, the protocol structure of a UE 102 (e.g., UE 102a or UE 102b) may include a common PDCP entity, and the common PDCP entity may be associated with one RLC entity for an M-DRB and one RLC entity for a U-DRB of UE 102. Each of the two RLC entities may be associated with a corresponding PHY entity.

In FIG. 13, the protocol structure of the UE 102 may include one MAC entity. The M-DRB has a specific LCID (for example, LCID1), which is unique in a cell or in a multicast area including at least one cell. The U-DRB may also have a corresponding LCID (for example, LCID2). In the physical layer, the M-DRB is scrambled by a G-RNTI, and the U-DRB of UE 102 is scrambled by a C-RNTI of UE 102.

In the above embodiments, a common PDCP entity is used for an M-DRB and a U-DRB of the UE 102. The biggest advantage of the common PDCP entity is to provide the service continuity when switching between the M-DRB and the U-DRB.

In order to provide lossless switching between M-DRB and U-DRB, some embodiments of the present application provides the functionalities of the common PDCP entity.

In an embodiment of the present application, for a PDCP PDU received from a lower layer than the PDCP layer, the common PDCP entity may remove a COUNT value or a sequence number from the PDCP PDU to generate a PDCP SDU.

The common PDCP entity may also determine whether the PDCP PDU is received from the first RLC entity or the second RLC entity. If the PDCP PDU is received from the second RLC entity for the U-DRB and a security function is configured for each U-DRB, the common PDCP entity may use a COUNT value or a sequence number, a security algorithm, and key of the UE associated with the PDCP PDU to perform an integrity verification and/or a de-ciphering for the PDCP SDU. If the PDCP PDU is received from the first RLC entity, the common PDCP entity may skip the integrity verification and/or the de-ciphering.

After that, in the case that a header decompression function is configured in the common PDCP entity, the common PDCP entity may perform a head decompression to the PDCP SDU.

Figure 14:
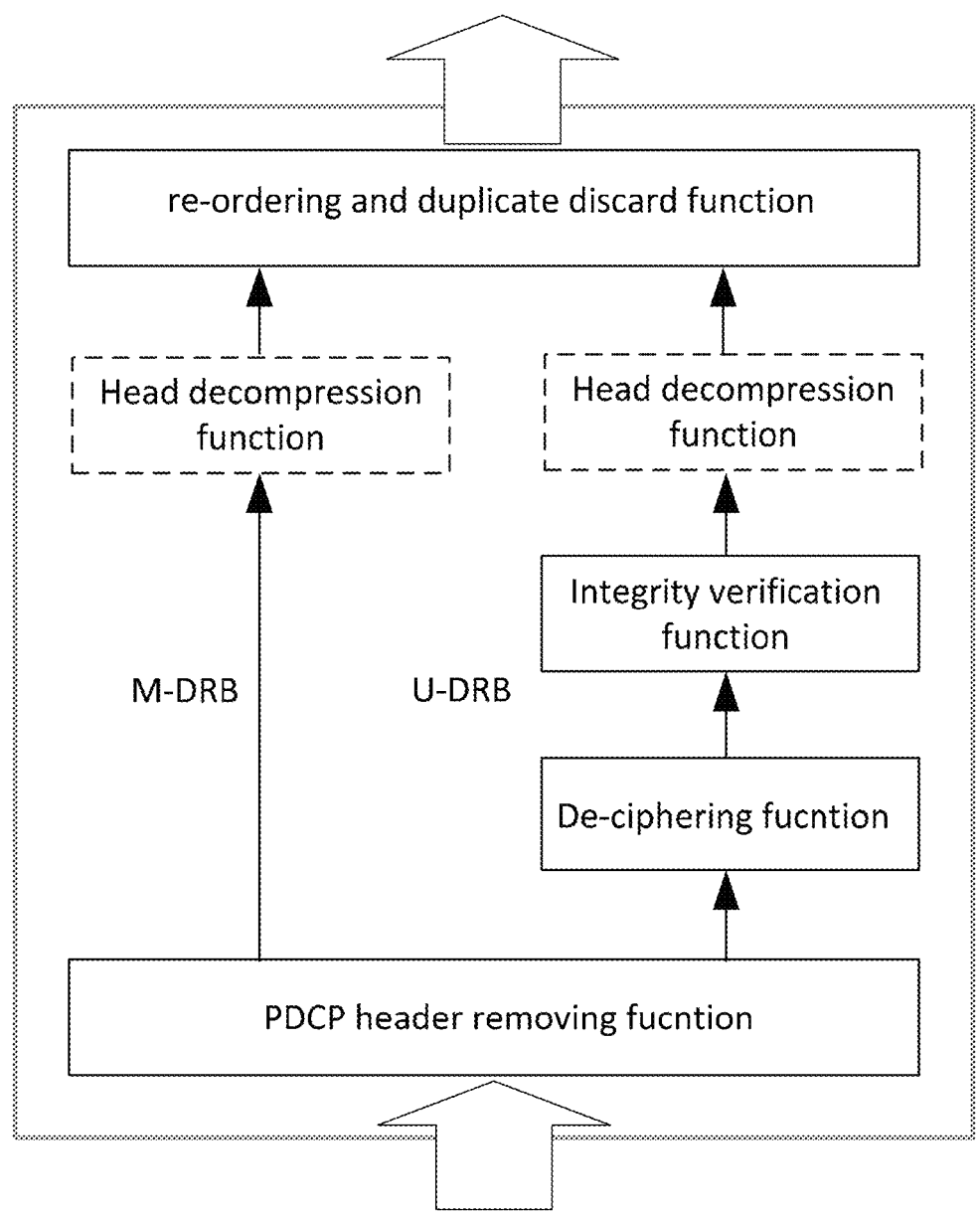
FIG. 14 illustrates an example of a PDCP entity of a UE according to some embodiments of the present application.

For example, FIG. 14 illustrates an example of a PDCP entity of a UE 102 (for example, the UE 102a or the UE 102b) according to some embodiments of the present application. In the example of FIG. 13, the common PDCP entity is used for an M-DRB and a U-DRB of a UE 102 (e.g., UE 102a or UE 102b). In addition, in the example of FIG. 14, the security function is configured for the U-DRB.

As shown in FIG. 14, the PDCP entity may include the following functionalities (also referred to as functional modules).

PDCP head removing function: for a PDCP PDU received from a lower layer than the PDCP layer, the PDCP head removing function may remove a COUNT value or sequence number from the header of the PDCP SDU to generate a PDCP SDU.

In addition, the PDCP entity may also determine whether the PDCP PDU is received from the first RLC entity or the second RLC entity. If the PDCP PDU is received from the second RLC entity for the U-DRB, the associated PDCP SDU may be summited to the security function. If the PDCP PDU is received from the first RLC entity, the common PDCP entity may skip the integrity verification and/or the de-ciphering.

Security function (for example, integrity verification function and/or de-ciphering function): for the PDCP PDU received from the second RLC entity for the U-DRB, the security function may perform integrity verification and de-ciphering of the PDCP SDU using the COUNT value or the sequence number associated with the PDCP PDU and the security algorithm and key of the UE 102. After performing the security function, the PDCP SDU may be submitted to a head decompression function if it is configured or to a re-ordering and duplicate discard function if the head decompression function is not configured Since the security function is not configured for the M-DRB, the PDCP entity will skip the integrity protection and ciphering for the PDCP SDU if the PDCP PDU is received from the first RLC entity for the M-DRB. Therefore, the PDCP SDU may be submitted to a head decompression function if it is configured or to a re-ordering and duplicate discard function if the head decompression function is not configured.

Head decompression function: the head compression function is an optional function. In the case that it is configured in the common PDCP entity, the head decompression may be performed for the PDCP SDU. In the case that it is not configured in the common PDCP entity, the common PDCP entity will not perform the head compression for the PDCP SDU. The PDCP SDU will be submitted to the re-ordering and duplicate discard function after performing the head decompression.

Re-ordering and duplicate discard function: this function may perform re-ordering and duplicate discard function for the PDCP SDU and submit the PDCP SDU to upper layers than the PDCP layer.

Figure 15:
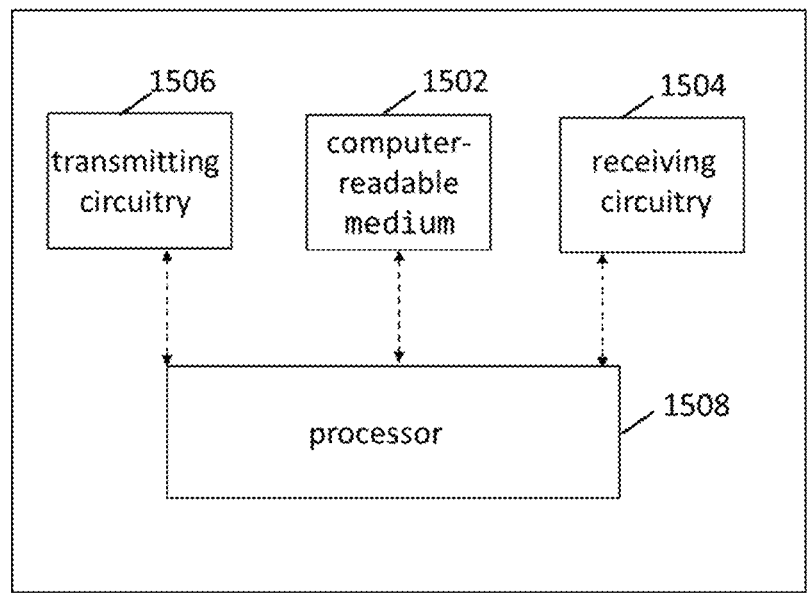
FIG. 15 illustrates a simplified block diagram of an apparatus for MB S according to some embodiments of the present application.

FIG. 15 illustrates a simplified block diagram of an apparatus 1500 for frequency hopping with multiple beams according to some embodiments of the present application. The apparatus 1500 may be a UE 102 (for example, the UE 102a or the UE 102b) as shown in FIG. 1.

Referring to FIG. 15, the apparatus 1500 may include at least one non-transitory computer-readable medium 1502, at least one receiving circuitry 1504, at least one transmitting circuitry 1506, and at least one processor 1508. In some embodiment of the present application, at least one receiving circuitry 1504 and at least one transmitting circuitry 1506 and be integrated into at least one transceiver. The at least one non-transitory computer-readable medium 1502 may have computer executable instructions stored therein. The at least one processor 1508 may be coupled to the at least one non-transitory computer-readable medium 1502, the at least one receiving circuitry 1504 and the at least one transmitting circuitry 1506. The computer executable instructions can be programmed to implement a method with the at least one receiving circuitry 1504, the at least one transmitting circuitry 1506 and the at least one processor 1508. The method can be a method according to an embodiment of the present application, for example, the method shown in FIG. 2.

Figure 16:
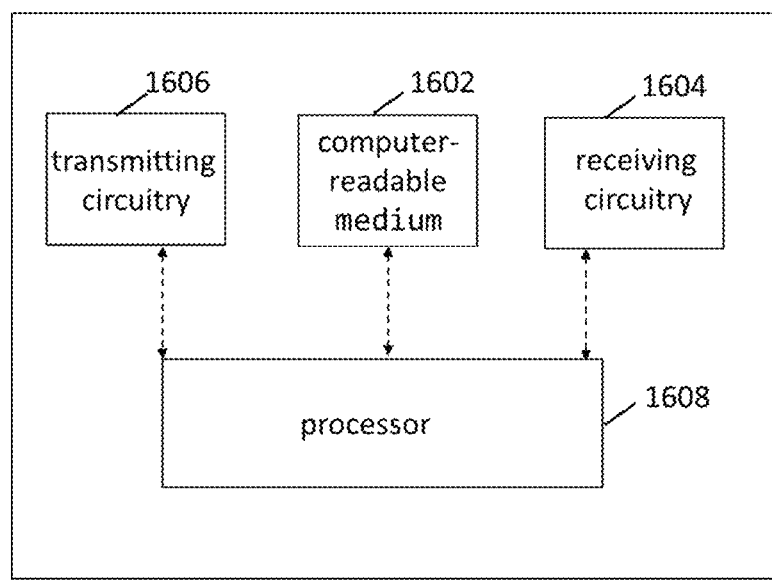
FIG. 16 illustrates a simplified block diagram of an apparatus for MB S according to some other embodiments of the present application.

FIG. 16 illustrates a simplified block diagram of an apparatus 1600 for frequency hopping with multiple beams according to some embodiments of the present application. The apparatus 1600 may be a BS 101 as shown in FIG. 1.

Referring to FIG. 16, the apparatus 1600 may include at least one non-transitory computer-readable medium 1602, at least one receiving circuitry 1604, at least one transmitting circuitry 1606, and at least one processor 1608. In some embodiment of the present application, at least one receiving circuitry 1604 and at least one transmitting circuitry 1606 and be integrated into at least one transceiver. The at least one non-transitory computer-readable medium 1602 may have computer executable instructions stored therein. The at least one processor 1608 may be coupled to the at least one non-transitory computer-readable medium 1602, the at least one receiving circuitry 1604 and the at least one transmitting circuitry 1606. The computer executable instructions can be programmed to implement a method with the at least one receiving circuitry 1604, the at least one transmitting circuitry 1606 and the at least one processor 1608. The method can be a method according to an embodiment of the present application, for example, the method shown in FIG. 11.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. An apparatus, comprising:
at least one non-transitory computer-readable medium having computer executable instructions stored therein;
at least one receiver;
at least one transmitter; and
at least one processor coupled to the at least one non-transitory computer-readable medium, the at least one receiver and the at least one transmitter;
wherein the computer executable instructions are programmed to implement a method, the method comprising:
determining an association identity (ID) for associating a common layer entity with a first lower layer entity for a multicast data radio bearer (M-DRB) and a second lower layer entity for a unicast data radio bearer (U-DRB); and
transmitting configuration information including the association ID.

2. The apparatus of claim 1, wherein the M-DRB refers to a radio bearer or an RLC bearer for data transmission via a point to multipoint (PTM) mode and is scrambled by a group radio network temporary identifier (G-RNTI) in at least one cell, the U-DRB refers to a radio bearer or a RLC bearer for data transmission via a point to point (PTP) mode and is scrambled by a cell radio network temporary identifier (C-RNTI).

3. The apparatus of claim 1, wherein the common layer entity comprises a sequence numbering function.

4. The apparatus of claim 1, wherein the common layer comprises a packet data convergence protocol (PDCP) entity, the first lower layer entity comprises a first radio link control (RLC) entity, and the second lower layer entity comprises a second RLC entity.

5. The apparatus of claim 4, wherein the association ID comprises one of the followings:
a M-DRB ID,
a U-DRB ID,
a logical channel ID (LCID),
a temporary mobile group identifier (TMGI),
a G-RNTI; and
an ID which is used to identify the association.

6. The apparatus of claim 4, wherein the association ID includes an M-DRB ID of the M-DRB and a U-DRB ID of the U-DRB.

7. The apparatus of claim 4, further comprising:
allocating a COUNT value or a sequence number for a PDCP service data unit (SDU).

8. An apparatus, comprising:
at least one non-transitory computer-readable medium having computer executable instructions stored therein;
at least one receiver;
at least one transmitter; and
at least one processor coupled to the at least one non-transitory computer-readable medium, the at least one receiver and the at least one transmitter;
wherein the computer executable instructions are programmed to implement a method, the method comprising:
receiving configuration information including an association identity (ID) for associating a common layer entity with a first lower layer entity for a multicast data radio bearer (M-DRB) and a second lower layer entity for a unicast data radio bearer (U-DRB); and
configuring at least one of the common layer entity, the first lower layer entity, and the second lower layer entity based on the configuration information.

9. The apparatus of claim 8, wherein the M-DRB refers to a radio bearer or a RLC bearer for data transmission via a point to multipoint (PTM) mode and is scrambled by a group radio network temporary identifier (G-RNTI) in at least one cell, the U-DRB refers to a radio bearer or a RLC bearer for data transmission via a point to point (PTP) mode and is scrambled by a cell radio network temporary identifier (C-RNTI).

10. The apparatus of claim 8, wherein the common layer entity comprises a sequence numbering function.

11. The apparatus of claim 8, wherein the common layer entity comprises a packet data convergence protocol (PDCP) entity, the first lower layer entity comprises a first radio link control (RLC) entity, and the second lower layer entity comprises a second RLC entity.

12. The apparatus of claim 8, wherein the association ID is received in a radio resource control (RRC) reconfiguration message.

13. An apparatus, comprising:
a common layer entity;
a first lower entity for a multicast data radio bearer (M-DRB); and
at least one second lower layer entity, wherein each of the at least one second lower layer entity is associated with a unicast data radio bearer (U-DRB) of a user equipment (UE);
wherein the common layer entity is associated with the first lower entity for the M-DRB and the at least one second lower entity.

14. The apparatus of claim 13, wherein the common layer entity comprises at least one of a packet data convergence protocol (PDCP) entity, a radio link control (RLC) entity, and a medium access control (MAC) entity, wherein the first lower layer entity comprises a first PHY layer, and wherein the at least one second lower entity comprises at least one second PHY entity.

15. The apparatus of claim 13, wherein the common layer entity comprises a PDCP entity, wherein the first lower layer entity comprises a first RLC entity, and wherein the at least one second lower entity comprises at least one second RLC entity.

16. The apparatus of claim 15, wherein the common PDCP entity allocates a COUNT value or a sequence number for a PDCP service data unit (SDU).

17. The apparatus of claim 16, wherein the common PDCP entity duplicates a PDCP service data unit (SDU) into a plurality of PDCP SDUs, wherein the plurality of PDCP SDUs includes a first PDCP SDU for the M-DRB and at least one second PDCP SDU for at least one U-DRB, wherein each PDCP SDU of the at least one PDCP SDU is associated with a U-DRB of a UE.

18. The apparatus of claim 17, wherein for each of the at least one second PDCP SDU, the common PDCP entity uses the COUNT value or the sequence number, a security algorithm, and key of the UE associated with a PDCP SDU to perform an integrity protection and/or a ciphering for the PDCP SDU to generate a secured PDCP SDU.

19. The apparatus of claim 18, wherein the common PDCP entity:
adds the COUNT value or the sequence number to the first PDCP SDU to generate a first PDCP protocol data unit (PDU) for the M-DRB;
adds the COUNT value or the sequence number to each of the at least one secured PDCP SDU to generate at least one second PDCP PDU for the at least one U-DRB;
submits the first PDCP PDU to the first RLC entity; and
submits each of the at least one second PDCP PDU to a respective one of the at least one second RLC entity.

20. The apparatus of claim 16, wherein the common PDCP entity performs a head compression to each of the plurality of PDCP SDUs.

* * * * *